Dec. 15, 1970 TADASHI ICHIZUKA ET AL 3,547,521
COMPACT ZOOM LENS AND BEAM SPLITTING SYSTEM
Filed June 28, 1968
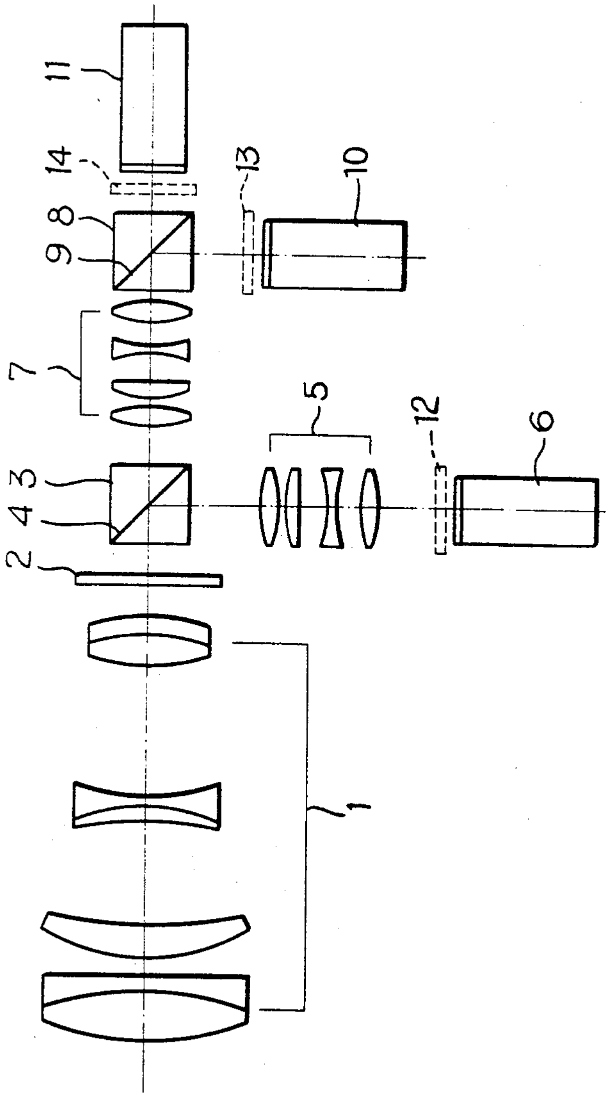
INVENTORS
TADASHI ICHIZUKA
KIYOSHI MIYAGI
BY Steinberg & Blake
ATTORNEYS

United States Patent Office 3,547,521

Patented Dec. 15, 1970

3,547,521

COMPACT ZOOM LENS AND BEAM SPLITTING SYSTEM

Tadashi Ichizuka, Tokyo-to, and Kiyoshi Miyagi, Kadoma-shi, Japan, assignors to Cosmicar Kogaku Kabushiki Kaisha, Tokyo-to, Japan, a corporation of Japan Filed June 28, 1968, Ser. No. 741,167
Claims priority, application Japan, July 1, 1967, 42/42,091
Int. Cl. G02b *27/14;* G03b *33/12;* H04n *9/08*
U.S. Cl. 350—171 3 Claims

ABSTRACT OF THE DISCLOSURE

A color separating beam splitter is placed in the space required between the objective and relay lens means of a zoom lens system. The transmitted portion of the entering light passes through the relay lens means and into a second color separating beam splitter which further divides it into two beams which are then directed to separate pick-up means. The portion of the entering light which is reflected from the first beam splitter passes through a second relay lens means to another pick-up means. This compact arrangement yields an unusually small and light color television camera. The amount of light directed to one of the pick-up tubes can be much greater than that directed to the other pick-up tubes, and used for control purposes.

BACKGROUND OF THE INVENTION

The present invention relates to optical systems for providing images of an object in three primary colors Optical systems of this type are used, for example, in color television cameras to transmit to three pick-up means of the television camera three images of an object in three primary colors, respectively.

It is conventional in optical systems of this general type to provide a multi-layered interference filter assembly which is positioned behind the objective. This interference filter assembly requires a considerable amount of space in which the filter structure is incorporated, and the result is that the optical system must have an excessively long back focal length. The result is that systems of this type require relay lens assemblies of equal magnification also to have a relatively long back focal length, such relay lens assemblies being required in addition to an objective. As a result, conventional optical systems of this general type suffer from the drawback of requiring extremely long optical paths. Thus, in the case where such optical systems are used in a teelvision camera for example, the camera is necessarily of an undesirably large size.

SUMMARY OF THE INVENTION

It is accordingly a primary object of the present invention to provide an optical system of the above general type which requires far less space than conventional systems so that an exceedingly compact structure can be provided with the result that a device such as a color television camera can be made smaller and lighter than has theretofore been possible.

A further object of the invention is to provide a color system which can achieve these results while maintaining the best possible operation of the system, particularly in connection with the optical qualities thereof.

In particular, it is an object of the invention to provide a color system of this type which can operate very efficiently to provide one of the primary colors in an amount of light greater than the amounts of light for the other primary colors, so that the one primary color in the greatest amount of light can be used for control purposes.

In accordance with the invention the optical system includes a pair of lens means situated along a common optical axis at a distance from each other along the optical axis which defines at the optical axis a given space which is required between the pair of lens means. In accordance with the invention a first color-separating means is located at least in part at the optical axis within this space which is required between the pair of lens means, and this first color-separating means coacts with the light received thereby to direct an image in one primary color away from the optical axis while transmitting the light from one to the other of the pair of lens means along the optical axis. At the side of the other lens means which is opposite from the first color-separating means there is located at least in part at the optical axis a second color-separating means which receives light from the other lens means to coact with this latter light to transmit a pair of images in the other two primary colors, respectively. A pair of pick-up means coact with the second color-separating means to receive therefrom the images in the two primary colors transmitted by the second color-separating means, while a third pick-up means coacts with the first color-separating means to receive from the latter the image in the primary color which is directed away from the optical axis by the first color-separating means.

BRIEF DESCRIPTION OF DRAWING

The invention is illustrated by way of example in the accompanying drawing which forms part of this application and in which an embodiment of the invention is schematically illustrated.

DESCRIPTION OF PREFERRED EMBODIMENTS

Referring now to the drawings, the structure illustrated therein inclused a pair of lens means 1 and 7 which are located along a common optical axis and which are spaced from each other along the optical axis by a distance which defines between the pair of lens means 1 and 7 a space which is required between this pair of lens means. The lens means 1 forms an objective lens means of variable focal length in the form of a well-known zoom lens of a television camera, for example. The lens means 7 forms a relay lens means. Situated on the optical axis just behind the lens means 1 is an Nd filter 2 for adjusting the light intensity of the rays situated at the image side of the objective 1.

In accordance with the invention a first color-separating means is situated between the pair of lens means 1 and 7 at least in part at the optical axis at the space which in any event is required between the pair of lens means 1 and 7. In the illustrated example this first color separating means includes a prism 3 provided with a semi-transparent dichroic reflector 4 which coacts with the light received from the lens means 1 to direct away from the optical axis an image in one of the primary colors while transmitting the light along the optical axis from the lens means 1 to the lens means 7, so that images in the other two primary colors can be derived from the light transmitted by the color separating means 3, 4 to the relay lens means 7.

A second relay lens means 5 is situated in the path of the light which is directed away from the optical axis by the first color-separating means 3, 4. This second relay lens means 5 directs the light in the primary color determined by the dichroic layer 4 to a pick-up means 6 which is of a well known structure including a tube in which is situated a screen which receives the image in the primary color determined by the color-separating means 3, 4.

A second color-separating means 8, 9 is situated along the optical axis at the side of the lens means 7 opposite from the first color-separating means 3, 4. This second color-separating means also includes a prism 8 provided with a dichroic layer 9 which is in the form also of a semi-transparent reflector acting to direct away from the optical axis an image in a second primary color while continuing to transmit along the optical axis a third image of a given object in the third primary color.

A pair of pick-up means 10 and 11 coact with the second color-separating means 8, 9 to receive therefrom the images in the two primary colors derived by way of this second color-separating means 8, 9. Thus, the pick-up means 10 which may be identical with the pick-up means 6 except that it receives the image in a different primary color, coacts with the color-separating means 8, 9 to receive from the latter the image in that primary color which is directed away from the optical axis, while the pick-up means 11 coacts with the color-separating means 8, 9, to receive the third image in the third primary color and operates similarly to the other pair of pick-up means 6, 10 in a well known manner according to which the required image is received on a screen in the tube of the pick-up means.

In the illustrated example the optical system provides the three images of the object in the additive primary colors red, green, and blue. The construction of the dichroic layer 4 is such that it will transmit a green primary color image to the pick-up means 6, while images in the other two primary colors will be received by the pair of pick-up means 10, 11. Thus, the pick-up means 10 can receive the red image in accordance with the construction of the dichroic layer 9, in which case the pick-up means 11 will receive the blue image, or the dichroic layer 9 may be constructed so that the blue image is received by the pick-up means 10 and the red image is received by the pick-up means 11.

It is also possible to provide a construction according to which the layers 4 and 9 are simply semi-transparent reflectors which are not dichroic and which do not perform any color-separating function. However, in this case the pair of color-separating means include, in addition to the semi-transparent reflecting layers 4 and 9 color filters which are respectively situated in front of the pick-up means 6, 10, and 11. With such a construction a filter 12 will be situated in front of the pick-up means 6 to admit only the green primary color thereto, while a filter 13 will be situated in front of the pick-up means 10 to transmit a blue image to the latter and a filter 14 will be situated in front of the pick-up means 11 to transmit a red image to the pick-up means 11. In this case also it is of course possible to reverse the filters 13 and 14 so that the blue image is received by the pick-up means 11 and the red image by the pick-up means 10.

With the above-described optical system of the invention, the light from the objective lens means 1 after having its intensity regulated by the filter 2, will have the green wave length component thereof directed by the first color-separating means 3, 4 to the screen in the tube of the pick-up means 6, the relay lens means 5 acting to focus the image on this latter screen. The light which is transmitted through the color-separating means 3, 4 to the relay lens means 7 is acted upon by the color-separating means 8, 9 so that the light of red wave length will be transmitted to the pick-up means 11 and the light of blue wave length will be transmitted to the pick-up means 10.

Of course, in the case where the elements 4 and 9 are simply semi-transparent reflectors, the filters 12–14 will function in the above-described manner to provide images in the green, blue and red primary colors at the pick-up means 6, 10 and 11, respectively. These three primary color images respectively picked up by the plurality of pick-up means 6, 10 and 11, are transmitted in separate channels to be picked up by well-known electrical controls so as to be transmitted as color image signals in a manner well known in television cameras.

In the image pick-up operation of the so-called separated brightness type of color television camera wherein the image of a given object is separated by trichroic separation of the optical system into three differently colored components, the output signal for the green primary color is generally used as the main factor to determine the image brightness signals. Therefore, the resolution and brightness of the green primary color image must be greater than those of the other two primary color images.

For these latter reasons, the brightness distribution over the image areas is brought about in such a way that the green primary color wavelength is used as the main light for control purposes while the brightness of the red primary color image may be on the order of ¼ to ⅛ of that of the green primary color image and the brightness of the blue image may be less than ⅛ of the green primary color image. Thus, the greatest amount of light is provided in the green primary color image which is used for control purposes. Experience has shown that color composition can be achieved in a fully satisfactory manner if the signal outputs derived from the red and blue images are electrically amplified and adjusted.

With the optical system of the invention as described above, in view of the different characteristics of the images in a television camera which includes this structure, the prism 3 is situated in the space which in any event is required between the pair of lens means 1 and 7 in order to bring about the transmission of the basic green primary color image to the pick-up means 6 in an amount of light which is substantially greater than the amounts of light for the other two primary color images, so that the resolution as well as the brightness of the image at the signal output of the pick-up means 6 will be substantially without any reduction as a result of the action of the color-separating means 3, 4 on the light received thereby. Thus, to achieve the desired resolution and brightness of the main green primary color image, the color separating means 3, 4 acts on the light received thereby in such a way that there will be a fully adequate intensity provided by the greater amount of light for the green primary color image so that the best possible signals can be achieved with the best possible controls.

Because, in accordance with the invention, the first color-separating means 3, 4 is situated within the space which is in any event required between the pair of lens means 1 and 7, the entire system is far more compact and of a lighter weight than has heretofore been possible with conventional systems where combinations of a plurality of mirrors are required behind each group of relay lenses.

With the construction of the invention, the use of prisms as part of the color-separating means enables the dichroic layers to be relatively thin so as to improve the optical operation by reducing astigmatism while extending the focal length of the relay lens means as desired in order to reduce the incidence of the light rays with respect to the prism and thus reduce undesirable reflections and interference.

It is to be noted that the pair of relay lens means 5 and 7 are not required to have any particular optical relationship one with respect to the other. Even in the case where the pair of relay lens means 5 and 7 are of different focal lengths, no special constructions are required since such a difference in the focal lengths of the pair of relay lens means can easily be compensated by proper electrical controls.

The above-described structure represents a preferred embodiment of the invention. However, when the objective itself is composed of a combination of lenses which define a relatively large space in the objective, as in the case of a retro-focus type of objective, then one of the dichroic reflectors can be situated in this latter space directly in the objective itself. Particularly, with such a construction, when the dichroic mirror is situated between the front negative lens and the rear positive lens of the retro-focus objective, the incidence with respect to this mirror can be very advantageously reduced to an extremely great extent as a result of the characteristics peculiar to this type of lens means.

With the above-described structure the green primary color image is provided with the greatest amount of light so as to prevent lowering of the resolution and brightness of the green primary color image so that the latter can be used for control purposes. However, it is also possible to provide a construction where the first color-separating means 3, 4 acts to direct one of the primary color images with a relatively small amount of light away from the optical axis while transmitting the larger amount of the green primary color through the first color-separating means to the relay lens means 7 so that by way of the second color-separating means 8, 9 the larger amount of light of the green primary color can be directed to one or the other of the pair of pickup means 10, 11. With this latter construction the blue image will be directed to the pick-up means 6 inasmuch as the blue primary color requires less brightness than the other primary colors.

It is to be noted that the pair of relay lens means 5 and 7 are not relay lens assemblies in the sense that they transfer an image without any change in the magnification thereof. Each of the relay lens means 5 and 7 is a component of the zoom lens system so as to form part of the entire objective lens assembly.

What is claimed is:

1. In an optical system to be used with an apparatus requiring images of an object to be transmitted in three primary colors, respectively, first and second lens means forming a pair of lens means situated along a common optical axis at a given distance from each other and defining at said axis a space which is required between said pair of lens means, said first lens means being an objective lens means of variable focal length forming a zoom lens and said second lens means being a relay lens means forming a component of a zoom lens system which includes said first and second lens means, a first color-separating means situated at least in part in said space at said optical axis for transmitting light from said first to said second lens means and for reflecting an image in one of the primary colors away from said optical axis to a third lens means identical to said relay lens means, and second color-separating means situated at least in part along said optical axis at the side of said relay lens means opposite from said first color-separating means for reflecting an image of the object in a second primary color away from said optical axis and for transmitting a third image of the object in a third primary color along the optical axis, and three pick-up means two of which coact with said second color-separating means and a third of which coacts with said first color-separating means and said third lens means for picking up the three primary color images therefrom, respectively.

2. The combination of claim 1 and wherein each of said color-separating means includes a semi-transparent dichroic reflector extending across the optical axis.

3. The combination of claim 1 and wherein the three primary colors are the additive primary colors red, green, and blue, and said first color-separating means reflects the green primary color image to said third lens means while said second color-separating means directs the blue and red primary color images to the other two pick-up means, and the amount of light forming the green image is much greater than the amount of light forming the blue and red images.

References Cited

UNITED STATES PATENTS

| | | | |
|---|---|---|---|
| 2,053,224 | 9/1936 | Reason | 350—171X |
| 2,809,570 | 10/1957 | Dearing et al. | 350—173X |
| 3,363,964 | 1/1968 | Macher | 350—186X |

DAVID SCHONBERG, Primary Examiner

J. W. LEONARD, Assistant Examiner

U.S. Cl. X.R.

95—12.2; 178—5.4; 350—173